US010924023B2

(12) United States Patent
Chen et al.

(10) Patent No.: US 10,924,023 B2
(45) Date of Patent: Feb. 16, 2021

(54) CONTROL CIRCUIT HAVING POWER LIMIT FOR AN AC-DC CONVERTER AND INTEGRATED CIRCUITS THEREOF

(71) Applicant: Chengdu Monolithic Power Systems Co., Ltd., Chengdu (CN)

(72) Inventors: Yuedong Chen, Chengdu (CN); Haishi Wang, Chengdu (CN); Lin Feng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/721,181

(22) Filed: Dec. 19, 2019

(65) Prior Publication Data

US 2020/0212813 A1 Jul. 2, 2020

(30) Foreign Application Priority Data

Dec. 28, 2018 (CN) .......................... 2018 1 1621926

(51) Int. Cl.
*H02M 3/335* (2006.01)
*H02M 1/08* (2006.01)
*H02M 1/00* (2006.01)

(52) U.S. Cl.
CPC ....... *H02M 3/33523* (2013.01); *H02M 1/083* (2013.01); *H02M 3/33515* (2013.01); *H02M 2001/0009* (2013.01)

(58) Field of Classification Search
CPC .... H02M 3/335; H02M 3/325; H02M 3/3353; H02M 3/33523; H02M 1/083; H02M 3/33515; H02M 2001/0009
See application file for complete search history.

(56) References Cited

U.S. PATENT DOCUMENTS

| 5,459,652 | A | * | 10/1995 | Faulk | H02M 1/36 363/49 |
| 6,972,969 | B1 | * | 12/2005 | Shteynberg | H02M 3/33523 363/21.12 |
| 9,787,194 | B2 | * | 10/2017 | Li | H02M 1/15 |
| 10,250,151 | B1 | * | 4/2019 | Wu | H02M 3/33592 |
| 10,826,401 | B2 | * | 11/2020 | Wang | H02M 3/33507 |
| 2008/0259655 | A1 | * | 10/2008 | Wei | H03K 3/017 363/21.18 |
| 2011/0063879 | A1 | * | 3/2011 | Murata | H02M 3/33523 363/21.13 |
| 2013/0223108 | A1 | * | 8/2013 | Xu | H02M 3/33507 363/21.17 |
| 2014/0313787 | A1 | * | 10/2014 | Chen | H02M 1/32 363/21.01 |

(Continued)

*Primary Examiner* — Adolf D Berhane
(74) *Attorney, Agent, or Firm* — Perkins Coie LLP

(57) ABSTRACT

A control circuit having power limit for controlling an AC-DC voltage converter. The control circuit includes a first sensing circuit having an auxiliary winding used to sense a voltage on an inductive element of the converter to generate a first sensing signal, a second sensing circuit used to sense the current flowing through the inductive element to provide a second sensing signal, and a power limit circuit. The power limit circuit generates a power indication signal indicative of the input power of the converter based on the first sensing signal and the second sensing signal. When the power indication signal is larger than a power threshold, a controllable switch of the converter is turned off.

17 Claims, 6 Drawing Sheets

(56) References Cited

U.S. PATENT DOCUMENTS

| | | | |
|---|---|---|---|
| 2014/0313793 A1* | 10/2014 | Ono | H02M 3/33523 363/21.15 |
| 2015/0207311 A1* | 7/2015 | Chang | H02H 5/042 361/91.1 |
| 2015/0334800 A1* | 11/2015 | Fawaz | H05B 45/10 315/294 |
| 2016/0020691 A1* | 1/2016 | Yoon | H05B 45/382 323/284 |
| 2016/0094131 A1* | 3/2016 | Baurle | H02M 1/32 363/21.17 |
| 2016/0261201 A1* | 9/2016 | Tao | H02M 3/33523 |
| 2017/0025958 A1* | 1/2017 | Yu | G06F 1/266 |
| 2017/0077825 A1* | 3/2017 | Yamane | H02M 3/33507 |
| 2017/0302185 A1* | 10/2017 | Tao | H02M 3/33515 |
| 2019/0190388 A1* | 6/2019 | Saji | H02M 3/33507 |
| 2019/0190398 A1* | 6/2019 | Tanioku | H02M 5/4585 |
| 2019/0252985 A1* | 8/2019 | Radic | H02M 1/36 |
| 2020/0036290 A1* | 1/2020 | Yang | H02M 1/14 |
| 2020/0112264 A1* | 4/2020 | Arima | H02M 1/32 |
| 2020/0141993 A1* | 5/2020 | Nikic | G01R 31/1263 |
| 2020/0287457 A1* | 9/2020 | Su | H02M 3/33523 |

* cited by examiner

CONTROL CIRCUIT HAVING POWER LIMIT FOR AN AC-DC CONVERTER AND INTEGRATED CIRCUITS THEREOF

CROSS-REFERENCE TO RELATED APPLICATION

This application claims the benefit of CN application No. 201811621926.7, filed on Dec. 28, 2018, and incorporated herein by reference.

TECHNICAL FIELD

The present invention generally refers to electrical circuit, more particularly but not exclusively relates to control circuit with power limit for AC/DC voltage converter and associated integrated circuits.

BACKGROUND

Generally, maximum input power limit may be necessary for preventing an AC/DC voltage converter from being destroyed. However, errors of maximum input power limit may be occurred due to output delays of the related elements, e.g., comparators, used for realizing maximum input power limit. Furthermore, the errors of maximum input power limit may be increased with the increasing of an input voltage of the AC/DC voltage converter. Thus, power compensation is also needed in a power limit circuit.

FIG. 1 illustrates a prior art block diagram of an AC-DC voltage converter 50. As shown in FIG. 1, the AC-DC voltage converter 50 receives an AC input signal VAC which is converted to an output voltage signal VOUT through a rectification circuit and a Flyback switching circuit. The AC-DC voltage converter 50 has an integrated circuit (IC) used for controlling a controllable switch of the Flyback switching circuit. Generally, the control IC has a feedback pin FB, a current sensing pin CS, a switching pin SW, and a high voltage pin HV. In prior art, sensing the input voltage through the high voltage pin HV is indispensable for realizing the maximum input power limit and the power compensation. However, the power dissipation used for maximum input power limit and power compensation is large since the voltage on the high voltage pin HV is high. Furthermore, in some applications, the AC-DC voltage converter which has a control IC without high voltage pin HV cannot acquire the input voltage directly for maximum input power limit and power compensation.

Therefore, it is desired to have a solution for efficiently limit the maximum input power with power compensation in the AC-DC voltage converter.

SUMMARY

Embodiments of the present invention are directed to a control circuit having power limit for controlling an AC-DC voltage converter comprising an inductive element and a controllable switch, wherein the controllable switch is coupled between the inductive element and a logic ground, the control circuit comprising: a first sensing circuit, comprising an auxiliary winding coupled to the inductive element, the first sensing circuit is configured to sense the voltage on the inductive element to generate a first sensing signal, wherein when the controllable switch is turned on, the first sensing signal is indicative of an input voltage signal of the AC-DC voltage converter, and wherein when the controllable switch is turned off, the first sensing signal is indicative of a current signal flowing through the inductive element; a second sensing circuit, connected between the controllable switch and the logic ground, wherein when the controllable switch is turned on, the second sensing circuit is configured to sense the current flowing through the inductive element to provide a second sensing signal, and wherein the second sensing signal is indicative of the current flowing through the inductive element; and a power limit circuit, configured to receive the first sensing signal and the second sensing signal, and further configured to generate a power indication signal based on the first sensing signal and the second sensing signal, wherein the power indication signal is indicative of the input power of the AC-DC voltage converter, and wherein when the power indication signal is larger than a power threshold, the controllable switch is turned off.

Embodiments of the present invention are further directed to an integrated circuit having power limit for controlling an AC-DC voltage converter comprising an inductive element and a controllable switch, wherein the controllable switch is coupled between the inductive element and a logic ground, the integrated circuit comprising: a zero-cross pin, coupled to a first sensing circuit to receive a first sensing signal, wherein the first sensing circuit comprising an auxiliary winding coupled to the inductive element to generate the first sensing signal, wherein when the controllable switch is turned on, the first sensing signal is indicative of an input voltage signal of the AC-DC voltage converter, and wherein when the controllable switch is turned off, the first sensing signal is indicative of the current signal flowing through the inductive element; a current sensing pin, coupled to a second sensing circuit to receive a second sensing signal, wherein the second sensing signal is indicative of the current flowing through the inductive element when the controllable switch is turned on; a switching pin, coupled to a control terminal of the controllable switch to provide a control signal; and a power limit circuit, coupled to the zero-cross pin and the current sensing pin to respectively receive the first sensing signal and the second sensing signal, and further configured to generate a power indication signal based on the first sensing signal and the second sensing signal, wherein the power indication signal is indicative of the input power of the AC-DC voltage converter, and wherein when the power indication signal is larger than a power threshold, the controllable switch is turned off.

Embodiments of the present invention are further directed to an integrated circuit having power limit for controlling an AC-DC voltage converter comprising an inductive element, the integrated circuit comprising: an input pin, coupled to the inductive element; a zero-cross pin, coupled to a first sensing circuit to receive a first sensing signal, wherein the first sensing circuit comprising an auxiliary winding coupled to the inductive element to generate the first sensing signal, wherein when the controllable switch is turned on, the first sensing signal is indicative of an input voltage signal of the AC-DC voltage converter, and wherein when the controllable switch is turned off, the first sensing signal is indicative of the current signal flowing through the inductive element; a controllable switch, having a first terminal coupled to the zero-cross pin, a second terminal and a control terminal; a second sensing circuit, connected between the second terminal of the controllable switch and a logic ground, wherein when the controllable switch is turned on, the second sensing circuit is configured to sense the current flowing through the inductive element to generate a second sensing signal, and wherein the second sensing signal is indicative of a current flowing through the inductive element; and a power limit circuit, coupled to the zero-cross pin and an output terminal of the second sensing circuit to respectively receive the first sensing signal and the second sensing signal, and further configured to generate a power indication signal based on the first sensing signal and the second sensing signal, wherein the power indication signal is indicative of the input power of the AC-DC voltage converter, and wherein when the power indication signal is larger than a power threshold, the controllable switch is turned off.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
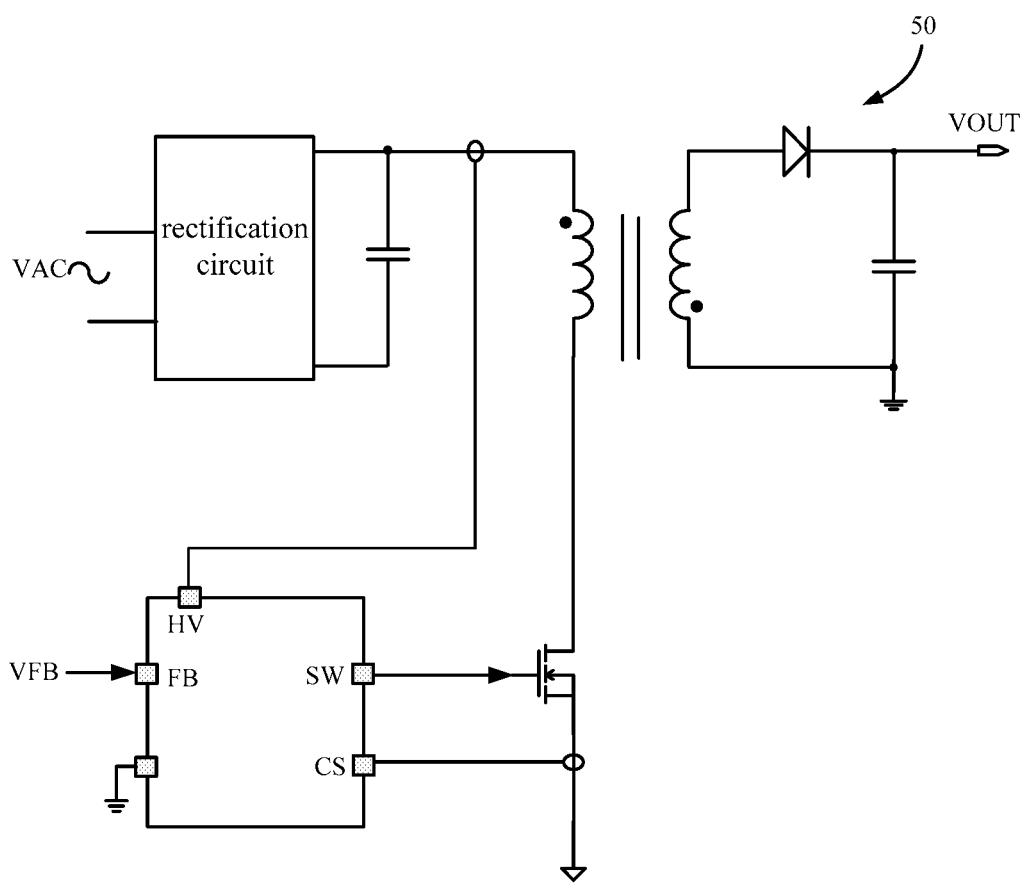
FIG. 1 illustrates a prior art block diagram of an AC-DC voltage converter 50.
Figure 2:
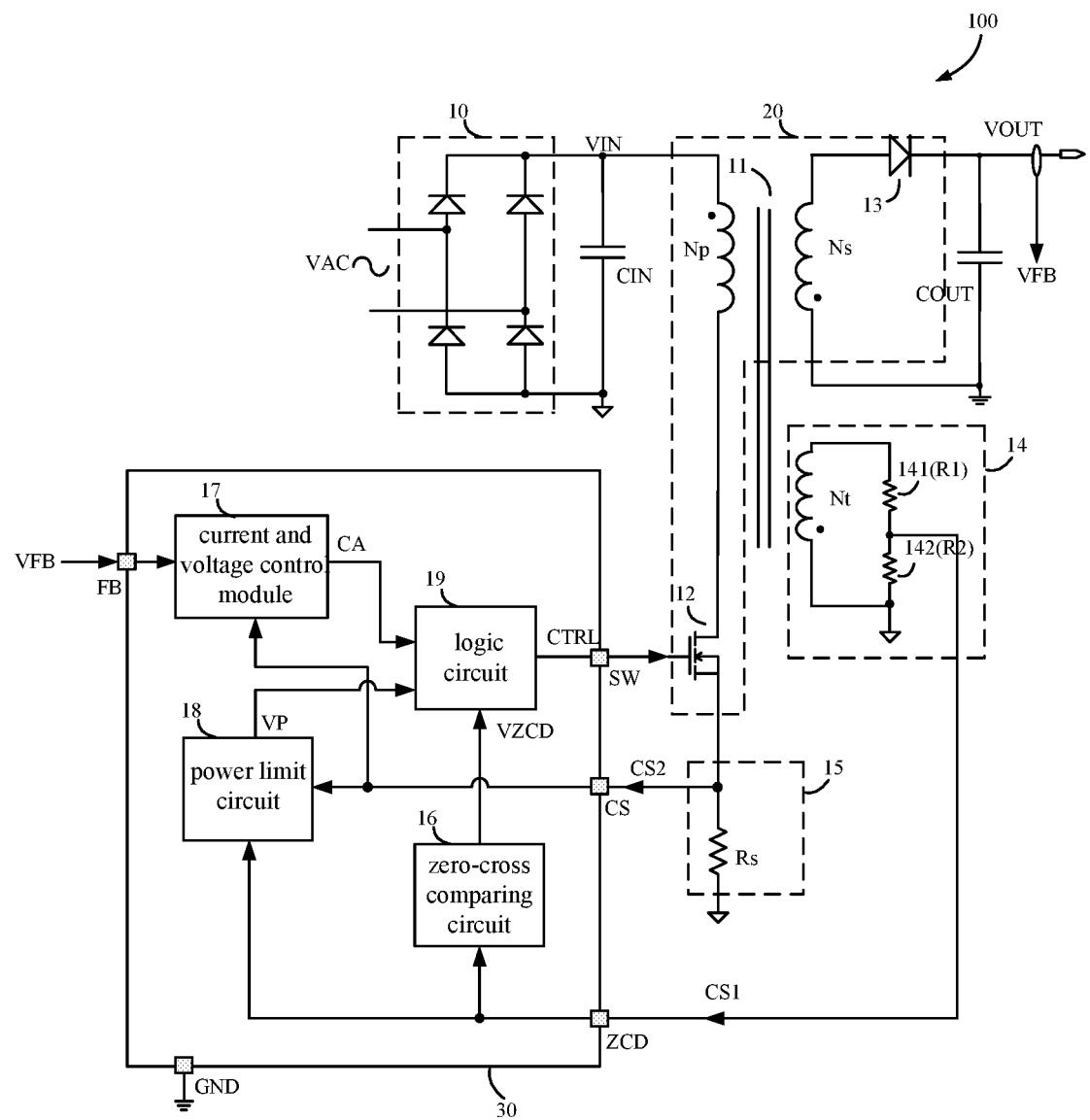
FIG. 2 illustrates a block diagram of an AC-DC voltage converter 100 having maximum power limit in accordance with an embodiment of the present invention.

FIG. 2 illustrates a block diagram of an AC-DC voltage converter 100 having maximum power limit in accordance with an embodiment of the present invention. As shown in FIG. 2, the AC-DC voltage converter 100 may comprise a rectification circuit 10, an input filter capacitor CIN, a switching circuit 20, an output filter capacitor COUT and a control circuit.

In an embodiment, the rectification circuit 10 may have an input terminal and an output terminal. The input terminal of the rectification circuit 10 is configured to receive an AC voltage signal VAC. The rectification circuit 70 may be configured to rectify the AC voltage signal VAC and to provide a DC voltage signal at the output terminal of the rectification circuit 10. The input filter capacitor CIN is configured to filter the DC voltage signal to generate an input voltage signal VIN.

In an embodiment, the switching circuit 20 may comprise at least one controllable switch. The switching circuit 20 may be coupled to the rectification circuit 70 for receiving the input voltage signal VIN and configured to convert the input voltage signal VIN to an output voltage signal VOUT through controlling the at least one controllable switch on and off. The switching circuit 20 may further comprise an inductive element configured to transfer energy. When the controllable switch is turned on, the current flowing through the inductive element is increased linearly, and the voltage across the inductive element is relates to the input voltage signal VIN. In an embodiment, the inductive element may comprise an inductor, or a transformer, etc. In the following embodiments, the switching circuit 20 is illustrated to have a Flyback topology as a preferred embodiment for description. As can be appreciated by the one of ordinary skill in the art, the switching circuit 20 may comprise other suitable topologies, such as a Boost topology, a Forward topology, etc.

In the exemplary embodiment of FIG. 2, the switching circuit 20 may comprise a transformer 11, a controllable switch 12 and a diode 13, wherein the controllable switch 12 is illustrated as an N-type Metal Oxide Semiconductor Field Effect Transistors ("NMOSFETs"). In another embodiment, the controllable switch 12 may comprise other suitable semiconductor devices such as P-type MOSFETs, Junction Field Effect Transistors ("JFETs"), Insulated Gate Bipolar Translators ("IGBTs"), and Double Diffusion Metal Oxide Semiconductor ("DMOS"), etc. The transformer 11 may comprise a primary winding Np and a secondary winding Ns. The controllable switch 12 and the primary winding Np of the transformer 11 may be connected in series between the positive terminal of the input filter capacitor CIN and a first logic ground, wherein a dotted terminal of the primary winding Np of the transformer 11 is connected to the positive terminal of the input filter capacitor CIN, and a non-dotted terminal of the primary winding Np of the transformer 11 is connected to the controllable switch 12. The secondary winding Ns also have a dotted terminal and a non-dotted terminal, wherein the dotted terminal of the secondary winding Ns is connected to a second logic ground, and the non-dotted terminal of the secondary winding Ns is connected to an anode of the diode 13. A cathode of the diode 13 is coupled to an output terminal of the AC-DC voltage converter 100. The output filter capacitor COUT is coupled between the cathode of the diode 13 and the second logic ground.

In the exemplary embodiment of FIG. 2, the control circuit may comprise a voltage feedback circuit (not shown in FIG. 2), a first sensing circuit 14, a second sensing circuit 15, a zero-cross comparing circuit 16, a current and voltage control module 17, a power limit circuit 18 and a logic circuit 19.

In an embodiment, the voltage feedback circuit may be configured to sense the output voltage signal VOUT to generate a voltage feedback signal VFB indicative of the output voltage signal VOUT. In an embodiment, the voltage feedback signal VFB can be generated via sensing the output voltage signal VOUT directly. In another embodiment, the voltage feedback signal VFB can be generated by adopting a tertiary winding coupled to the transformer to acquire the output voltage signal VOUT.

In an embodiment, the first sensing circuit 14 may comprise an auxiliary winding Nt coupled to the inductive element. The auxiliary winding Nt may be coupled to the inductive element to sense the voltage across the inductive element. The first sensing circuit 14 may be configured to generate a first sensing signal CS1. In an embodiment, when the controllable switch 12 is turned on, the first sensing signal CS1 may comprise a current signal indicative of the input voltage signal VIN of the AC-DC voltage converter 100. When the controllable switch 12 is turned off, the first sensing signal CS1 may comprise a voltage signal indicative of the current signal flowing through the inductive element. In the exemplary embodiment of FIG. 2 where the inductive element is illustrated as a transformer 11, when the controllable switch 12 is turned on, the first sensing signal CS1 may be indicative of the voltage across the primary winding Np of the transformer 11, i.e., the input voltage signal VIN of the AC-DC voltage converter 100. When the controllable switch 12 is turned off, the first sensing signal CS1 may be indicative of the current signal flowing through the secondary winding Ns of the transformer 11.

In the exemplary embodiment of FIG. 2, the first sensing circuit 14 may further comprise a first resistor 141 with a resistance R1 and a second resistor 142 with a resistance R2. A first terminal of the first resistor 141 is connected to the non-dotted terminal of the auxiliary winding Nt, a second terminal of the first resistor 141 is connected to a first terminal of the second resistor 142, and a second terminal of the second resistor 142 is connected to the dotted terminal of the auxiliary winding Nt and the first logic ground. The common connection of the first transistor 141 and the second resistor 142 is operated as an output terminal of the first sensing circuit 14 to provide the first sensing signal CS1.

In the exemplary embodiment of FIG. 2, the AC-DC voltage converter 100 may be configured to operate in a critical current mode ("CCM"). When the controllable switch 12 is turned on, the voltage across the auxiliary winding Nt is negative, and the first sensing signal CS1 may comprise a negative current signal generated by the negative voltage across the auxiliary winding Nt. When the controllable switch 12 is turned off, the phase of the voltage across the auxiliary winding Nt is opposition. Accordingly, the first sensing signal CS1 may comprise a voltage signal generated by the positive voltage across the auxiliary winding Nt and the current flowing through the secondary winding Ns is linearly decreased from a peak current value to zero. When the current flowing through the secondary winding Ns is equal to zero, the voltage across the auxiliary winding Nt will be dropped from a positive voltage to zero. In an embodiment, when the voltage across the auxiliary winding Nt is dropped to a zero-cross threshold, the controllable switch 12 is turned on again. Ideally, the zero-cross threshold may be equal to zero. Actually, the zero-cross threshold is slightly larger than zero.

In an embodiment, the second sensing circuit 15 may be configured to sense the current flowing through the inductive element to generate a second sensing signal CS2 when the controllable switch 12 is turned on. In the exemplary embodiment of FIG. 2, the second sensing circuit 15 may be configured to sense the current flowing through the primary winding Np of the transformer 11 to generate the second sensing signal CS2. In an embodiment, the second sensing circuit 15 may comprise a sense resistor Rs connected between the controllable switch 12 and the first logic ground. The common connection of the sense resistor Rs and the controllable switch 12 is operated as the output terminal of the second sensing circuit 15. In an embodiment, the second sensing signal CS2 may comprise the voltage across the sense resistor Rs.

In an embodiment, the zero-cross comparing circuit 16 may be configured to receive the first sensing signal CS1, and further configured to compare the first sensing signal CS1 with a zero-cross threshold so as to provide a zero-cross signal VZCD at its output terminal. The zero-cross signal VZCD may be configured to determine whether the current flowing through the inductive element achieves a zero-crossing. In the exemplary embodiment of FIG. 2, the zero-cross signal VZCD may be configured to determine whether the current flowing through the secondary winding Ns of the transformer 11 achieves a zero-crossing. In an embodiment, the zero-cross signal VZCD may be a logic signal having a first logic state (e.g., logic high) and a second logic low state (e.g., logic low). In an embodiment, the zero-cross signal VZCD is in an active state (e.g., logic high) when the current signal flowing through the secondary winding Ns of the transformer 11 decreases to the zero-cross threshold. In an embodiment, when the zero-cross signal VZCD is in the active state (e.g., logic high), the controllable switch is turned on.

In an embodiment, the current and voltage control module 17 may have a first terminal configured to receive the voltage feedback signal VFB, a second input terminal configured to receive the second sensing signal CS2, and an output terminal. The current and voltage control module 17 may be configured to generate a comparing signal CA based on the voltage feedback signal VFB and the second sensing signal CS2 at its output terminal. In an embodiment, the comparing signal CA is a logic signal having a first logic state (e.g., logic high) and a second logic low state (e.g., logic low). In an embodiment, when the comparing signal CA is in an active state (e.g., logic high), the controllable switch 12 is turned off. the current and voltage control module 17 may comprise various suitable modules for realizing different control methods, e.g., peak current control, average current control, hysteresis current control, etc., for controlling the current and voltage of the AC-DC voltage converter 100 in accordance with different applications.

In an embodiment, the power limit circuit 18 may have a first terminal configured to receive the first sensing signal CS1, a second input terminal configured to receive the second sensing signal CS2, and an output terminal. During the on period of the controllable switch 12, the power limit circuit 18 may be configured to generate a power indication signal based on the first sensing signal CS1 and the second sensing signal CS2, and further configured to compare the power indication signal with a maximum power threshold to generate a power limit signal VP at its output terminal, wherein the power indication signal is indicative of an input power of the AC-DC voltage converter 100. In an embodiment, the power limit signal VP is a logic signal having a first logic state (e.g., logic high) and a second logic low state (e.g., logic low). In an embodiment, when the power indication signal is larger than the maximum power threshold, the power limit signal VP is in the active state (e.g., logic high) to turn off the controllable switch 12.

In an embodiment, the logic circuit 19 may be configured to receive the zero-cross signal VZCD, the comparing signal CA and the power limit signal VP, and further configured to conduct a logical operation to the zero-cross signal VZCD, the comparing signal CA and the power limit signal VP to generate a control signal CTRL to control the controllable switch 12 on and off. In an embodiment, the control signal CTRL is a logic signal having a first logic state (e.g., logic high) and a second logic low state (e.g., logic low). In an embodiment, when the control signal CTRL is active (e.g., logic high), the controllable switch 12 is turned on; and when the control signal CTRL is inactive (e.g., logic low), the controllable switch 12 is turned off.

In an embodiment, the zero-cross comparing circuit 16, the current and voltage control module 17, the power limit circuit 18 and a logic circuit 19 may be integrated on a monolithic die. As shown in FIG. 2, the monolithic die is illustrated as an integrated circuit ("IC") 30 comprising a zero-cross pin ZCD, a current sensing pin CS, a feedback pin FB, a switching pin SW, and a ground pin GND. The zero-cross pin ZCD may be coupled to the first sensing circuit 14 to receive the first sensing signal CS1, the current sensing pin CS may be coupled to the second sensing circuit 15 to receive the second sensing signal CS2, the feedback pin FB may be coupled to the voltage feedback circuit to receive the voltage feedback signal VFB, the switching pin SW may be coupled to the control terminal of the controllable switch 12 to provide the control signal CTRL, and the ground pin GND is connected to the first logic ground. In the internal of the IC 30, the input terminal of the zero-cross comparing circuit 16 and the first input terminal of the power limit circuit 18 may be coupled together to the zero-cross pin ZCD, the second input terminal of the power limit circuit 18 and the second input terminal of the current and voltage control module 17 may be coupled together to the current sensing pin CS, the first input terminal of the current and voltage control module 17 may be coupled to the voltage feedback signal VFB; and the output terminal of the logic circuit 19 is coupled to the switching pin SW.

In the exemplary embodiment of FIG. 2, only the zero-cross comparing circuit 16, the current and voltage control module 17, the power limit circuit 18 and the logic circuit 19 are illustrated to be integrated on the monolithic die. In the other embodiments, besides the zero-cross comparing circuit 16, the current and voltage control module 17, the power limit circuit 18 and a logic circuit 19, the controllable switch 12 and the second sensing circuit 15 can also be integrated on the same monolithic die.

Figure 3:
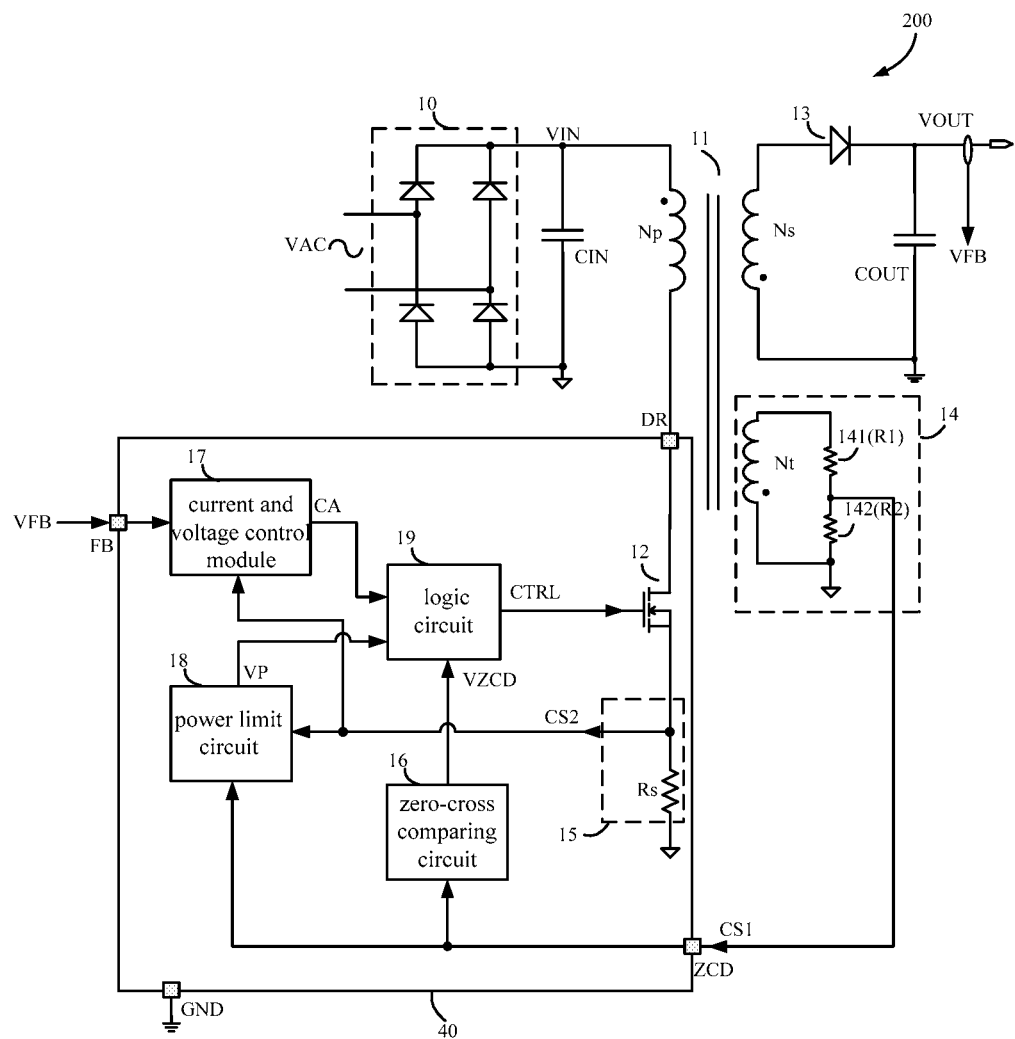
FIG. 3 illustrates a block diagram of an AC-DC voltage converter 200 having maximum power limit in accordance with an embodiment of the present invention.

FIG. 3 illustrates a block diagram of an AC-DC voltage converter 200 having maximum power limit in accordance with an embodiment of the present invention. Comparing to the AC-DC voltage converter 100, the AC-DC voltage converter 200 may comprise an IC 40 in which the controllable switch 12, the second sensing circuit 15, the zero-cross comparing circuit 16, the current and voltage control module 17, the power limit circuit 18 and the logic circuit 19 are illustrated to be integrated on the IC 40. The IC 40 may comprise a zero-cross pin ZCD, an input pin DR, a feedback pin FB and a ground pin GND. The zero-cross pin ZCD of the IC 40 may be coupled to the first sensing circuit 14 to receive the first sensing signal CS1, the input pin DR of the IC 40 may be coupled to the non-dotted terminal of the primary winding NP of the transformer 11, the feedback pin FB of the IC 40 may be coupled to the voltage feedback circuit to receive the voltage feedback signal VFB, and the ground pin GND of the IC 40 may be connected to the first logic ground. In the internal of the IC 40, the input terminal of the zero-cross comparing circuit 16 and the first input terminal of the power limit circuit 18 are coupled to the zero-cross pin ZCD, the first terminal of the controllable switch is coupled to the input pin DR, and the first input terminal of the current and voltage control module 17 is coupled to the voltage feedback signal VFB. The connection relationships of the controllable switch 12, the second sensing circuit 15, the zero-cross comparing circuit 16, the current and voltage control module 17, the power limit circuit 18 and the logic circuit 19 in the internal of the IC 40 are the same as that have been described with reference to FIG. 2, and will not be described here in detail again.

Figure 4:
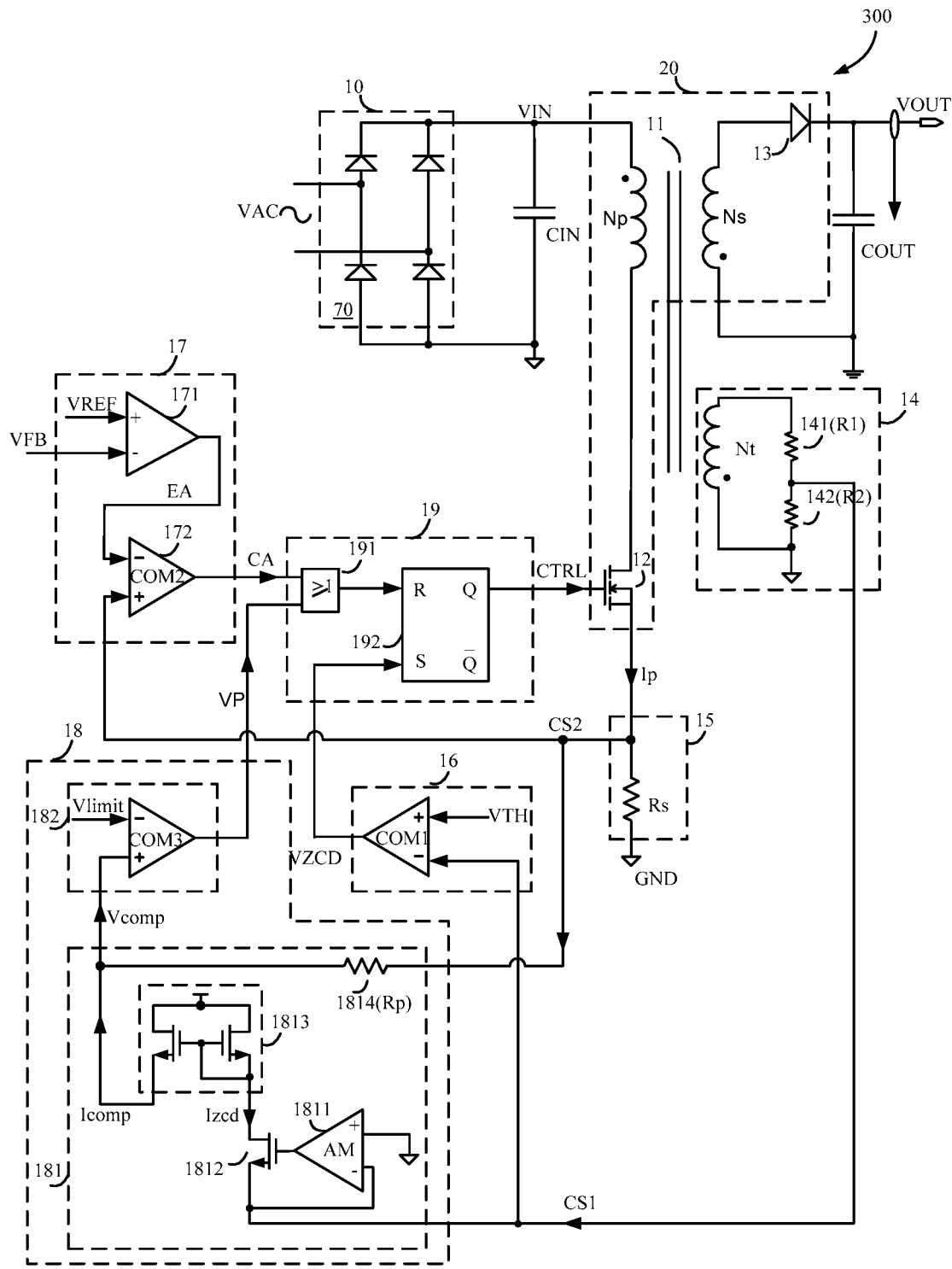
FIG. 4 schematically illustrates an AC-DC voltage converter 300 having maximum power limit in accordance with an embodiment of the present invention.

FIG. 4 schematically illustrates an AC-DC voltage converter 300 having maximum power limit in accordance with an embodiment of the present invention. As shown in FIG. 4, the AC-DC voltage converter 300 may comprise the rectification circuit 10, the input filter capacitor CIN, the switching circuit 20, the output filter capacitor COUT and the control circuit. And the control circuit of the AC-DC voltage converter 300 may comprise a voltage feedback circuit, the first sensing circuit 14, the second sensing circuit 15, the zero-cross comparing circuit 16, the current and voltage control module 17, the power limit circuit 18 and the logic circuit 19. The schematics and connection relationships of the rectification circuit 10, the input filter capacitor CIN, the switching circuit 20, the output filter capacitor COUT, the first sensing circuit 14, and the second sensing circuit 15 have been described as a preferred embodiment in accordance with FIG. 2, and will not be described here again. In the following, only the schematics of the zero-cross comparing circuit 16, the current and voltage control module 17, the power limit circuit 18 and the logic circuit 19 will be descripted in detail.

In an embodiment, the zero-cross comparing circuit 16 may comprise a comparator COM1 having a first input terminal, a second input terminal and an output terminal. The first input terminal of the comparator COM1 may be configured to receive the first sensing signal CS1. The second input terminal of the comparator COM1 may be configured to receive a zero-cross threshold VTH. The comparator COM1 may be configured to compare the first sensing signal CS1 with the zero-cross threshold VTH to provide the zero-cross signal VZCD at its output terminal. The zero-cross signal VZCD may be configured to determine whether the current flowing the secondary winding Ns achieves a zero-crossing. Ideally, the zero-cross threshold VTH may be equal to zero. Actually, the zero-cross threshold VTH is slightly larger than zero, for example, in a range from a voltage of 0.25V to a voltage of 0.75V. When the controllable switch 12 is turned off, the voltage across the auxiliary winding Nt is positive, thus, the first sensing signal CS1 is a positive voltage signal having an equation with the output voltage signal VOUT shown as below:

$$CS1 = \frac{VOUT \times R2}{k1 \times (R1 + R2)} \qquad (1)$$

Wherein k1 is indicative of a turns ratio of the secondary winding NS and the auxiliary winding Nt. With decreasing of the current flowing the secondary winding Ns from a peak current value to zero, the diode 13 is in a reverse blocking state and the voltage across the auxiliary winding Nt will be pulled down to zero. In an embodiment, when the second sensing signal CS2 is equal to the zero-cross threshold signal VTH, the controllable switch 12 is turned on.

In an embodiment, the current and voltage control module 17 may comprise an error amplifying circuit 171 and a current comparing circuit 172.

In an embodiment, the error amplifying circuit 171 may have a first input terminal, a second input terminal and an output terminal. The first input terminal of the error amplifying circuit 171 may be configured to receive the voltage feedback signal VFB. The second input terminal of the error amplifying circuit 171 may be configured to receive a reference signal VREF, wherein the reference signal VREF is indicative of a desired voltage of the output voltage VOUT of the AC-DC voltage converter 100. The error amplifying circuit 171 may be configured to amplify the difference of the voltage feedback signal VFB and the reference signal VREF to provide an error signal EA at the output terminal of the error amplifying circuit 171. In an embodiment, the error amplifying circuit 171 may comprise an error amplifier having an inversing input terminal, a non-inversing input terminal and an output terminal. The inversing input terminal of the error amplifier may be operated as the first input terminal of the error amplifying circuit 171, and the non-inversing input terminal of the error amplifier may be operated as the second input terminal of the error amplifying circuit 171.

In an embodiment, the current comparing circuit 172 may have a first input terminal, a second input terminal and an output terminal. The first input terminal of the current comparing circuit 172 may be configured to receive the error signal EA. The second input terminal of the current comparing circuit 172 may be configured to receive the second sensing signal CS2. The current comparing circuit 172 may be configured to compare the error signal EA with the second sensing signal CS2 to provide a comparing signal CA at the output terminal of the current comparing circuit 172. In an embodiment, when the second sensing signal CS2 is larger than the error signal EA, the controllable switch 12 may be turned off. In an embodiment, the current comparing circuit 172 may comprise a comparator COM2 having an inversing input terminal, a non-inversing input terminal and an output terminal. The inversing input terminal of the comparator COM2 may be operated as the first input terminal of the current comparing circuit 172, and the non-inversing input terminal of the comparator COM2 may be operated as the second input terminal of the current comparing circuit 172.

In the exemplary embodiment of FIG. 4, the power limit circuit 18 may comprise a power indication signal generator 181 and a power comparing circuit 182. In an embodiment, the power indication signal generator 181 may be configured to receive the first sensing signal CS1 and the second sensing signal CS2. During the on period of the controllable switch 12, the power indication signal generator 181 may be configured to generate a power complement signal Icomp based on the first sensing signal CS1. In an embodiment, the power complement signal Icomp may comprise a current signal. Furthermore, the power indication signal generator 181 may be further configured to generate a power indication signal Vcomp based on the second sensing signal CS2 and the power complement signal Icomp, wherein the power indication signal Vcomp is indicative of the input power of the AC-DC voltage converter 300.

In the exemplary embodiment of FIG. 4, the power indication signal generator 181 may comprise an operational amplifier 1811, a transistor 1812, a current mirror 1813 and a resistor 1814 with a resistance Rp. The operational amplifier 1811 may have a first input terminal configured to receive the first sensing signal CS1, a second input terminal coupled to the first logic ground, and an output terminal. The transistor 1812 may have a first terminal coupled to the first input terminal of the operational amplifier 1811, a second terminal, and a control terminal coupled to the output terminal of the operational amplifier 1811. The current mirror 1813 may have a first current terminal coupled to the second terminal of the transistor 1812, a second current terminal configured to provide the power complement signal Icomp. The resistor 1814 may have a first terminal coupled to the output terminal of the second sensing circuit 15 to receive the second sensing signal CS2, and a second terminal coupled to the second current terminal of the current mirror 1813 to receive the power complement signal Icomp. A common connection of the second terminal of the resistor 1814 and the second current terminal of the current mirror 1813 is operated as an output terminal of the power indication signal generator 181. In an embodiment, voltage on the second terminal of the resistor 1814 is regarded as the power indication signal Vcomp.

At the moment when the state of the controllable switch 12 is changed from the off state to the on state, the voltage on the common connection of the first resistor 141 and the second resistor 142 is negative so that the transistor 1812 will be turned on. Then, the voltage on the common connection of the first resistor 141 and the second resistor 142 is pulled to zero by the operational amplifier 1811. Therefore, the auxiliary winding Nt and the first resistor 141 will generate a pull down current signal Izcd at the output terminal of the first sensing circuit 14. That is to say, the first sensing signal CS1 may comprises a negative current signal, i.e., the pull down current signal Izcd. The current mirror 1813 may be configured to mirror the pull down current signal Izcd to generate a power complement signal Icomp at the second current terminal of the current mirror 1813. The relationships of the pull down current signal Izcd, the power complement signal Icomp and the input voltage signal VIN can be illustrated by the below equation (2):

$$Icomp = Izcd = \frac{VIN}{k2 \times R1} \quad (2)$$

wherein k2 is indicative of a turns ratio of the primary winding Np and the auxiliary winding Nt. The power complement signal Icomp may flow through the resistor 1814 and the sense resistor Rs to the first logic ground. Thus, the power indication signal Vcomp can be illustrated by the equation (3):

$$Vcomp = CS2 + \frac{VIN \times Rp}{k2 \times R1} \quad (3)$$

In such an application, the second sensing signal CS2 is equal to the voltage across the sense resistor Rs, i.e., CS2=Ip×Rs, wherein Ip is indicative of a current flowing through the primary winding Np of the AC-DC voltage converter 100. Since the input voltage signal VIN and the second sensing signal CS2 are proportional to the input power of the AC-DC voltage converter 300, the power indication signal Vcomp can be indicative of the input power of the AC-DC voltage converter 300 based on the foregoing equation (3). That is to say, during the on period of the controllable switch 12, the accurate input power information with power complement can be acquired. After the controllable switch 12 is turned off, the voltage on the common connection of the first resistor 141 and the second resistor 142 is reversed to a positive voltage signal so that the transistor 1812 is turned off so as to disable the power indication signal generator 181. During the off period of the controllable switch, the second sensing signal CS2 may comprise a voltage signal that is the voltage on the common connection of the first resistor 141 and the second resistor 142.

In an embodiment, the power comparing circuit 182 may be configured to receive the power indication signal Vcomp and a maximum power threshold Vlimit, and further configured to compare the power indication signal Vcomp with a maximum power threshold Vlimit to generate the power limit signal VP at its output terminal. In an embodiment, the maximum power threshold Vlimit may comprise a voltage signal indicative of the maximum input power threshold of the AC-DC voltage converter 300. In the exemplary embodiment of FIG. 4, the power comparing circuit 182 may comprise a comparator COM3 having a non-inverting terminal configured to receive the power indication signal Vcomp, an inverting terminal configured to receive the maximum power threshold Vlimit, and an output terminal. The comparator COM3 may be configured to compare the power indication signal Vcomp with the maximum power threshold Vlimit to generate the power limit signal VP at its output terminal. When the power indication signal Vcomp is larger than the maximum power threshold Vlimit, the power limit signal VP is logic high so as to turn off the controllable switch 12.

In an embodiment, the logic circuit 19 may comprise an OR logic gate 191 and a RS flip-flop 192.

The OR logic gate 191 may be configured to receive the comparing signal CA and the power limit signal VP, and further configured to conduct an OR logical operation to the comparing signal CA and the power limit signal VP to generate a reset signal. In an embodiment, either the comparing signal CA or the power limit signal VP is active, the reset signal is active (e.g., logic high).

The RS flip-flop 192 may have a reset terminal configured to receive the reset signal, a set terminal configured to receive the zero-cross signal VZCD and an output terminal. The RS flip-flop 192 may be configured to conduct a logical operation to the reset signal and the zero-cross signal VZCD to provide the control signal CTRL at the output terminal of the RS flip-flop 192. The control signal CTRL is configured to control the controllable switch 12 on and off. In an embodiment, when the reset signal is active (e.g., logic high), the controllable switch 12 may be turned off; when the zero-cross signal VZCD is active (e.g., logic high), the controllable switch 12 may be turned on.

Figure 5:
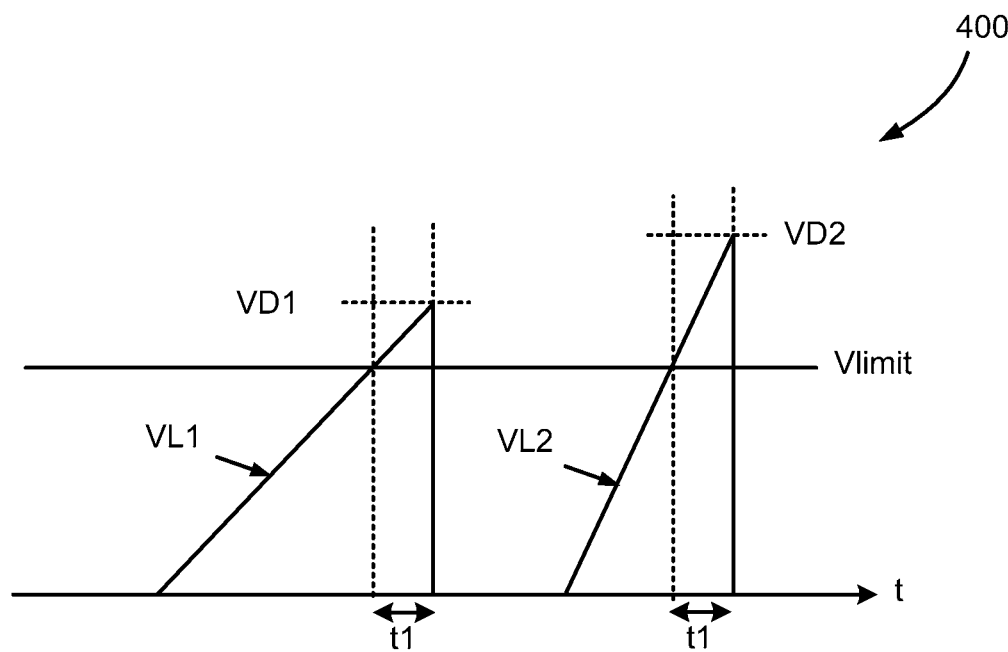
FIG. 5 illustrates a prior art schematic waveforms diagram 400 of an AC-DC voltage converter.

FIG. 5 illustrates a prior art schematic waveforms diagram 400 of an AC-DC voltage converter. As shown in FIG. 5, the waveforms diagram 400 respectively illustrates waveforms of a first voltage signal VL1 and a second voltage signal VL2, wherein the slope of the second voltage signal VL2 is sharper than the slope of the first voltage signal VL1. The first voltage signal VL1 may be indicative of a current signal flowing through the inductive element of the AC-DC voltage converter having a first input voltage signal, and the second voltage signal VL2 may be indicative of another current signal flowing through the inductive element of the AC-DC voltage converter having a second input voltage signal. In an embodiment, the first voltage signal VL1 and the second voltage signal VL2 may be corresponding to the second sensing signal CS2 respectively responding to two different values of the input voltage signal VIN. Since the rising slope of the current flowing through the inductive element is proportional to an input voltage signal of the AC/DC voltage converter, the first input voltage signal corresponding to the first voltage signal VL1 may be smaller than the second input voltage signal corresponding to the second voltage signal VL2.

As shown in the FIG. 5, as a result of a delay t1 of elements, e.g., a comparator in a power limit circuit, the first voltage signal VL1 may be increased cross the maximum power threshold Vlimit until to a first peak value VD1, and the second voltage signal VL2 may be increased cross the maximum power threshold Vlimit until to a second peak value VD2 larger than the first peak value VD1. That is, the controllable switch 12 would not be turned off even if the first voltage signal VL1 increases to the maximum power threshold Vlimit until to the first peak value VD1. The controllable switch 12 would not be turned off even if the second voltage signal VL2 is increased to the maximum power threshold Vlimit until to the second peak value VD2. In summary, without power complement, the maximum input power limit may occur errors. The errors of the maximum input power limit may be increased with the increase of the input voltage signal of the AC-DC voltage converter. The larger the input voltage VIN is, the larger the errors may occur.

Figure 6:
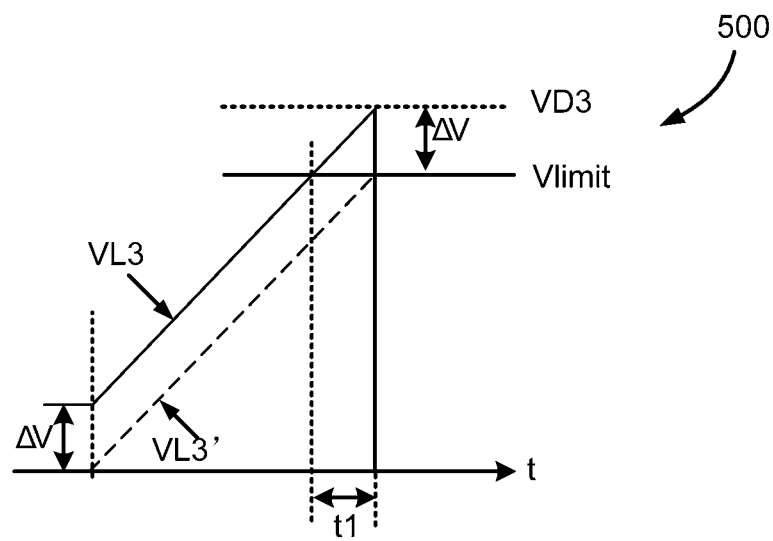
FIG. 6 illustrates a schematic waveforms diagram 500 of an AC-DC voltage converter in accordance with an embodiment of the present invention.

FIG. 6 illustrates a schematic waveforms diagram 500 of an AC-DC voltage converter in accordance with an embodiment of the present invention. As shown in FIG. 6, the schematic waveforms diagram 500 illustrates waveforms of a third voltage signal VL3 and a fourth voltage signal VL3'. The fourth voltage signal VL3' is indicative of the current flowing through the inductive element of the AC-DC voltage converter 300, and the third voltage signal VL3 is equal to the fourth voltage signal VL3' adding a compensation voltage $\Delta v$. In an embodiment, the third voltage signal VL3 may be corresponding to the power indication signal Vcomp, and the fourth voltage signal VL3' may be corresponding to the second sensing signal CS2. In an embodiment, such as the exemplary embodiment of FIG. 4, the compensation voltage $\Delta v$ is equal to Rp×Icomp. Combination with the equation (2), the compensation voltage $\Delta v$ can be illustrated by the equation (4):

$$\Delta v = \frac{VIN \times Rp}{k2 \times R1} \quad (4)$$

As shown in FIG. 6, the third voltage signal VL3 is also increased cross the maximum power threshold Vlimit until to a third peak value VD3 because of the delay t1 existed in the power comparing circuit 182. However, through setting the compensation voltage $\Delta v$ to be equal to the difference of third peak value VD3 and the maximum power threshold Vlimit, the error induced by the delay existed in the power comparing circuit 182 will be removed.

Figure 7:
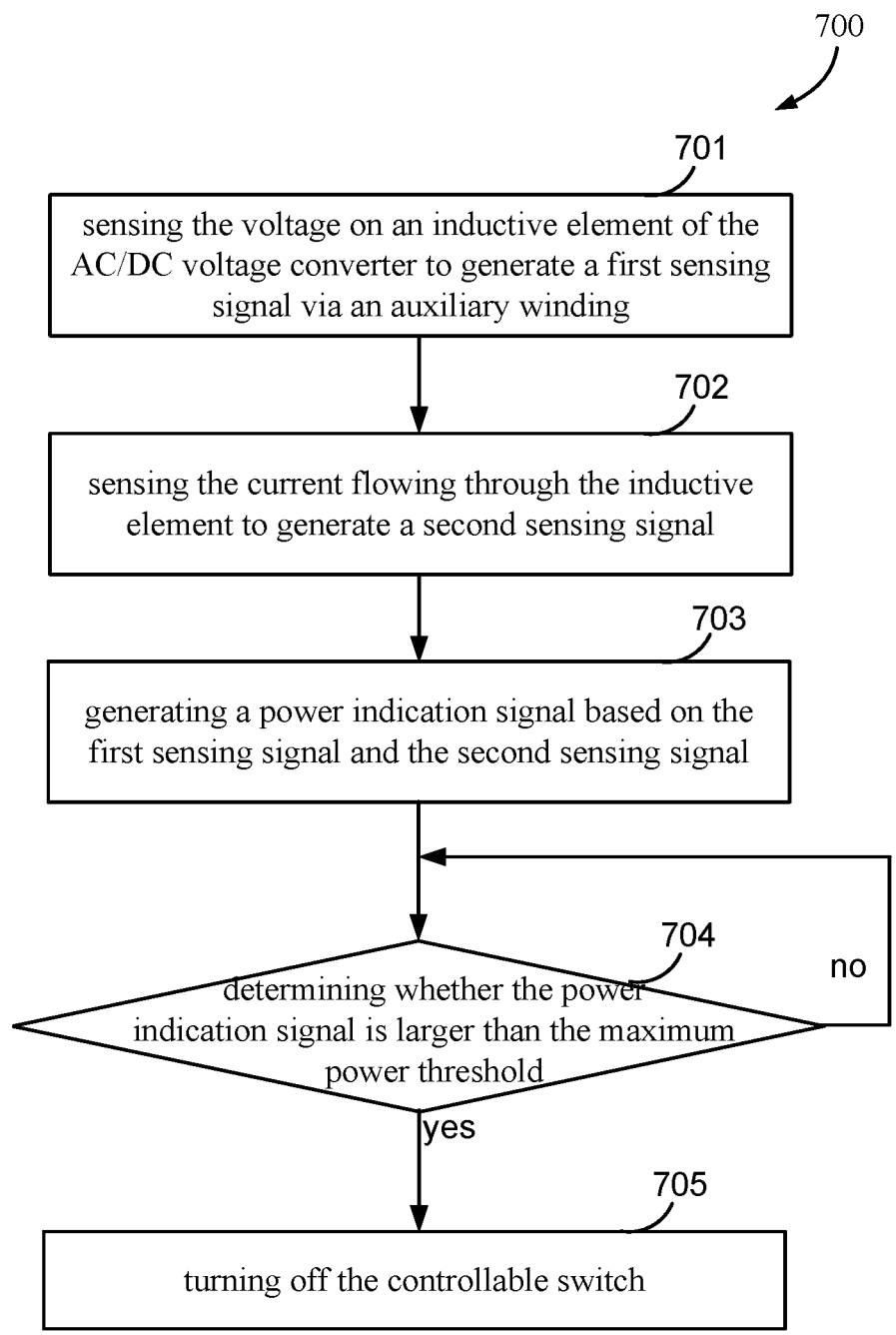
FIG. 7 illustrates a maximum input power limit method flow for an AC-DC voltage converter in accordance with an embodiment of the present invention.

FIG. 7 illustrates a maximum input power limit method flow for an AC-DC voltage converter in accordance with an embodiment of the present invention. The maximum input power limit method 700 can be adopted in the foregoing AC-DC converters of FIGS. 2-4 and other AC-DC converters included within the spirit and scope of the invention as defined by the appended claims. The maximum input power limit method 700 may comprise steps 701-705.

In step 701, sensing the voltage on an inductive element of the AC/DC voltage converter to generate a first sensing signal CS1 via an auxiliary winding Nt. When the controllable switch 12 is turned on, the first sensing signal CS1 may comprise a current signal, e.g., the pull down current signal Izcd, indicative of the voltage signal of the input voltage signal VIN of the AC/DC voltage converter. When the controllable switch 12 is turned off, the first sensing signal CS1 may comprise a voltage signal indicative of the current signal flowing through the inductive element.

In step 702, sensing the current flowing through the inductive element to generate a second sensing signal CS2.

In step 703, generating a power indication signal Vcomp based on the first sensing signal CS1 and the second sensing signal CS2, wherein the power indication signal Vcomp is indicative of an input power of the AC-DC voltage converter.

In step 704, determining whether the power indication signal Vcomp is larger than the maximum power threshold Vlimit.

In step 705, when the power indication signal Vcomp is larger than the maximum power threshold Vlimit, turning off the controllable switch 12.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A control circuit having power limit for controlling an AC-DC voltage converter comprising an inductive element and a controllable switch, wherein the controllable switch is coupled between the inductive element and a logic ground, the control circuit comprising:
   a first sensing circuit, comprising an auxiliary winding coupled to the inductive element, the first sensing circuit is configured to sense a voltage on the inductive element to generate a first sensing signal, wherein when the controllable switch is turned on, the first sensing signal is indicative of an input voltage signal of the AC-DC voltage converter, and wherein when the controllable switch is turned off, the first sensing signal is indicative of a current signal flowing through the inductive element;
   a second sensing circuit, connected between the controllable switch and the logic ground, wherein when the controllable switch is turned on, the second sensing circuit is configured to sense a current flowing through the inductive element to provide a second sensing signal; and
   a power limit circuit, configured to receive the first sensing signal and the second sensing signal, and further configured to generate a power indication signal based on the first sensing signal and the second sensing signal, wherein the power indication signal is indicative of an input power of the AC-DC voltage converter, and wherein when the power indication signal is larger than a power threshold, the controllable switch is turned off.

2. The control circuit of claim 1, wherein the power limit circuit further comprises:
   a power indication signal generator, configured to receive the first sensing signal and the second sensing signal, wherein during an on period of the controllable switch, the power indication signal generator is configured to generate a power complement signal based on the first sensing signal, and to generate the power indication signal based on the power complement signal and the second sensing signal; and
   a power comparing circuit, configured to receive the power indication signal and the power threshold, and further configured to compare the power indication signal with the power threshold to generate a power limit signal.

3. The control circuit of claim 2, wherein the power indication signal generator further comprises:
   an operational amplifier, having a first input terminal coupled to an output terminal of the first sensing circuit to receive the first sensing signal, a second input terminal coupled to the logic ground, and an output terminal;
   a transistor, having a first terminal coupled to the first input terminal of the operational amplifier, a second terminal, and an output terminal coupled to the output terminal of the operational amplifier;
   a current mirror, having a first current terminal coupled to the second terminal of the transistor, a second current terminal; and
   an indication resistor, having a first terminal coupled to an output terminal of the second sensing circuit to receive the second sensing signal, and a second terminal coupled to the second current terminal of the current mirror, wherein the voltage on the second terminal of the indication resistor is regarded as the power indication signal.

4. The control circuit of claim 2, wherein the inductive element comprises a transformer having a primary winding and a secondary winding, wherein the primary winding of the transformer is connected to the logic ground through the controllable switch, and wherein when the controllable switch is turned on, the first sensing signal is indicative of a voltage on the primary winding of the transformer, and wherein when the controllable switch is turned off, the first sensing signal is indicative of a current signal flowing through the secondary winding of the transformer.

5. The control circuit of claim 2, further comprising:
   a zero-cross comparing circuit, configured to receive the first sensing signal, and further configured to compare the first sensing signal with a zero-cross threshold to provide a zero-cross signal;
   a current and voltage control module, configured to receive a voltage feedback signal and the second sensing signal, and further configured to generate a comparing signal based on the voltage feedback signal and the second sensing signal, wherein the voltage feedback signal is indicative of an output voltage signal of the AC-DC voltage converter; and
   a logic circuit, configured to receive the zero-cross signal, the comparing signal and the power limit signal, and further configured to conduct a logical operation to the zero-cross signal, the comparing signal and the power limit signal to generate a control signal to control the controlled switch on and off.

6. The control circuit of claim 5, wherein the current and voltage control module comprises:
   an error amplifying circuit, configured to receive the voltage feedback signal and a reference signal, and further configured to amplify a difference between the voltage feedback signal and the reference signal to generate an error signal; and
   a current comparing circuit, configured to receive the error signal and the second sensing signal, and further configured to compare the error signal with the second sensing signal to provide the comparing signal.

7. The control circuit of claim 5, wherein the logic circuit further comprises:
   an OR logic gate, configured to receive the comparing signal and the power limit signal, and further configured to conduct an OR logical operation to the comparing signal and the power limit signal to generate a reset signal; and
   a RS flip-flop, having a reset terminal configured to receive the reset signal, a set terminal configured to receive the zero-cross signal, and an output terminal, wherein the RS flip-flop is configured to conduct a logical operation to the reset signal and the zero-cross signal to provide the control signal.

8. The control circuit of claim 1, wherein the first sensing circuit further comprises:
   a first resistor, having a first terminal connected to a first terminal of the auxiliary winding, and a second terminal; and
   a second resistor, having a first terminal connected to a second terminal of the first resistor, a second terminal connected to a second terminal of the auxiliary winding and the logic ground, wherein a common connection of the first transistor and the second resistor is operated as an output terminal of the first sensing circuit to provide the first sensing signal.

9. The control circuit of claim 1, wherein the second sensing circuit comprises a sense resistor connected between the controllable switch and the logic ground, and wherein a common connection of the sense resistor and the controllable switch is operated as an output terminal of the second sensing circuit to provide the second sensing signal.

10. An integrated circuit having power limit for controlling an AC-DC voltage converter comprising an inductive element and a controllable switch, wherein the controllable switch is coupled between the inductive element and a logic ground, the integrated circuit comprising:
    a zero-cross pin, coupled to a first sensing circuit to receive a first sensing signal, wherein the first sensing circuit comprising an auxiliary winding coupled to the inductive element to generate the first sensing signal, wherein when the controllable switch is turned on, the first sensing signal is indicative of an input voltage signal of the AC-DC voltage converter, and wherein when the controllable switch is turned off, the first sensing signal is indicative of a current signal flowing through the inductive element;
    a current sensing pin, coupled to a second sensing circuit to receive a second sensing signal, wherein the second sensing signal is indicative of a current flowing through the inductive element when the controllable switch is turned on;
    a switching pin, coupled to a control terminal of the controllable switch to provide a control signal; and
    a power limit circuit, coupled to the zero-cross pin and the current sensing pin to respectively receive the first sensing signal and the second sensing signal, and further configured to generate a power indication signal based on the first sensing signal and the second sensing signal, wherein the power indication signal is indicative of an input power of the AC-DC voltage converter, and wherein when the power indication signal is larger than a power threshold, the controllable switch is turned off.

11. The integrated circuit of claim 10, wherein the power limit circuit further comprises:
    a power indication signal generator, coupled to the zero-cross pin and the current sensing pin to respectively receive the first sensing signal and the second sensing signal, wherein during an on period of the controllable switch, the power indication signal generator is configured to generate a power complement signal based on the first sensing signal, and further configured to generate the power indication signal based on the power complement signal and the second sensing signal; and
    a power comparing circuit, configured to receive the power indication signal and the power threshold, and further configured to compare the power indication signal with the power threshold to generate a power limit signal.

12. The integrated circuit of claim 11, further comprising:
    a feedback pin, configured to receive a voltage feedback signal, wherein the voltage feedback signal is indicative of an output voltage signal of the AC-DC voltage converter;
    a zero-cross comparing circuit, coupled to the zero-cross pin to receive the first sensing signal, and further configured to compare the first sensing signal with a zero-cross threshold to provide a zero-cross signal;
    a current and voltage control module, coupled to the feedback pin to receive the voltage feedback signal and the second sensing signal, and further configured to generate a comparing signal based on the voltage feedback signal and the second sensing signal; and
    a logic circuit, configured to receive the zero-cross signal, the comparing signal and the power limit signal, and further configured to conduct a logical operation to the zero-cross signal, the comparing signal and the power limit signal to generate a control signal at the switching pin.

13. The integrated circuit of claim 10, wherein the inductive element comprises a transformer having a primary winding and a secondary winding, wherein the primary winding of the transformer is connected to the logic ground through the controllable switch, and wherein when the controllable switch is turned on, the first sensing signal is indicative of a voltage on the primary winding of the transformer, and wherein when the controllable switch is turned off, the first sensing signal is indicative of a current signal flowing through the secondary winding of the transformer.

14. An integrated circuit having power limit for controlling an AC-DC voltage converter comprising an inductive element, the integrated circuit comprising:
    an input pin, coupled to the inductive element;
    a zero-cross pin, coupled to a first sensing circuit to receive a first sensing signal, wherein the first sensing circuit comprising an auxiliary winding coupled to the inductive element to generate the first sensing signal, wherein when the controllable switch is turned on, the first sensing signal is indicative of an input voltage signal of the AC-DC voltage converter, and wherein when the controllable switch is turned off, the first sensing signal is indicative of the current signal flowing through the inductive element;
    a controllable switch, having a first terminal coupled to the zero-cross pin, a second terminal and a control terminal;

a second sensing circuit, connected between the second terminal of the controllable switch and a logic ground, wherein when the controllable switch is turned on, the second sensing circuit is configured to sense a current flowing through the inductive element to generate a second sensing signal; and a power limit circuit, coupled to the zero-cross pin and an output terminal of the second sensing circuit to respectively receive the first sensing signal and the second sensing signal, and further configured to generate a power indication signal based on the first sensing signal and the second sensing signal, wherein the power indication signal is indicative of an input power of the AC-DC voltage converter, and wherein when the power indication signal is larger than a power threshold, the controllable switch is turned off.

15. The integrated circuit of claim 14, wherein the power limit circuit further comprises:

a power indication signal generator, configured to receive the first sensing signal and the second sensing signal, wherein during an on period of the controllable switch, the power indication signal generator is configured to generate a power complement signal based on the first sensing signal, and further configured to generate the power indication signal based on the power complement signal and the second sensing signal; and a power comparing circuit, configured to receive the power indication signal and the power threshold, and further configured to compare the power indication signal with the power threshold to generate a power limit signal.

16. The integrated circuit of claim 15, further comprising:

a feedback pin, configured to receive a voltage feedback signal, wherein the voltage feedback signal is indicative of an output voltage signal of the AC-DC voltage converter;

a zero-cross comparing circuit, coupled to the zero-cross pin to receive the first sensing signal, and further configured to compare the first sensing signal with a zero-cross threshold to provide a zero-cross signal;

a current and voltage control module, coupled to the feedback pin to receive the voltage feedback signal and the second sensing signal, and further configured to generate a comparing signal based on the voltage feedback signal and the second sensing signal; and a logic circuit, configured to receive the zero-cross signal, the comparing signal and the power limit signal, and further configured to conduct a logical operation to the zero-cross signal, the comparing signal and the power limit signal to generate a control signal to the control terminal of the controllable switch.

17. The integrated circuit of claim 14, wherein the inductive element comprises a transformer having a primary winding and a secondary winding, wherein the primary winding of the transformer is connected to the input pin, and wherein when the controllable switch is turned on, the first sensing signal is indicative of a voltage on the primary winding of the transformer, and wherein when the controllable switch is turned off, the first sensing signal is indicative of a current signal flowing through the secondary winding of the transformer.

* * * * *